July 28, 1942.　　　W. M. DUNCAN　　　2,290,950
STORAGE LOADING MACHINE
Filed Nov. 8, 1940　　　2 Sheets-Sheet 1
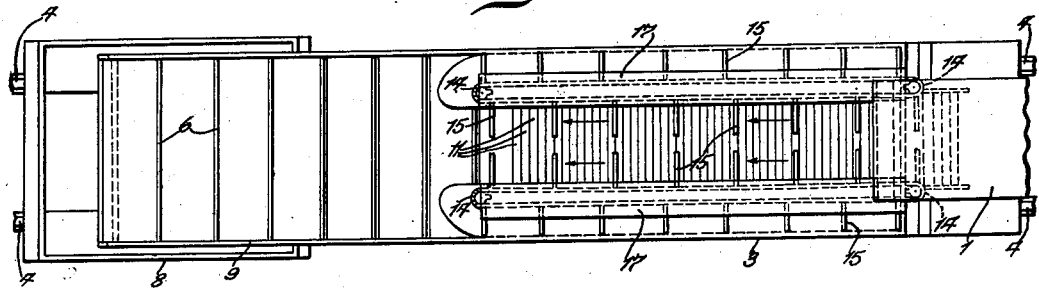
Inventor
William M. Duncan
Brunniga & Sutherland
His Attorneys

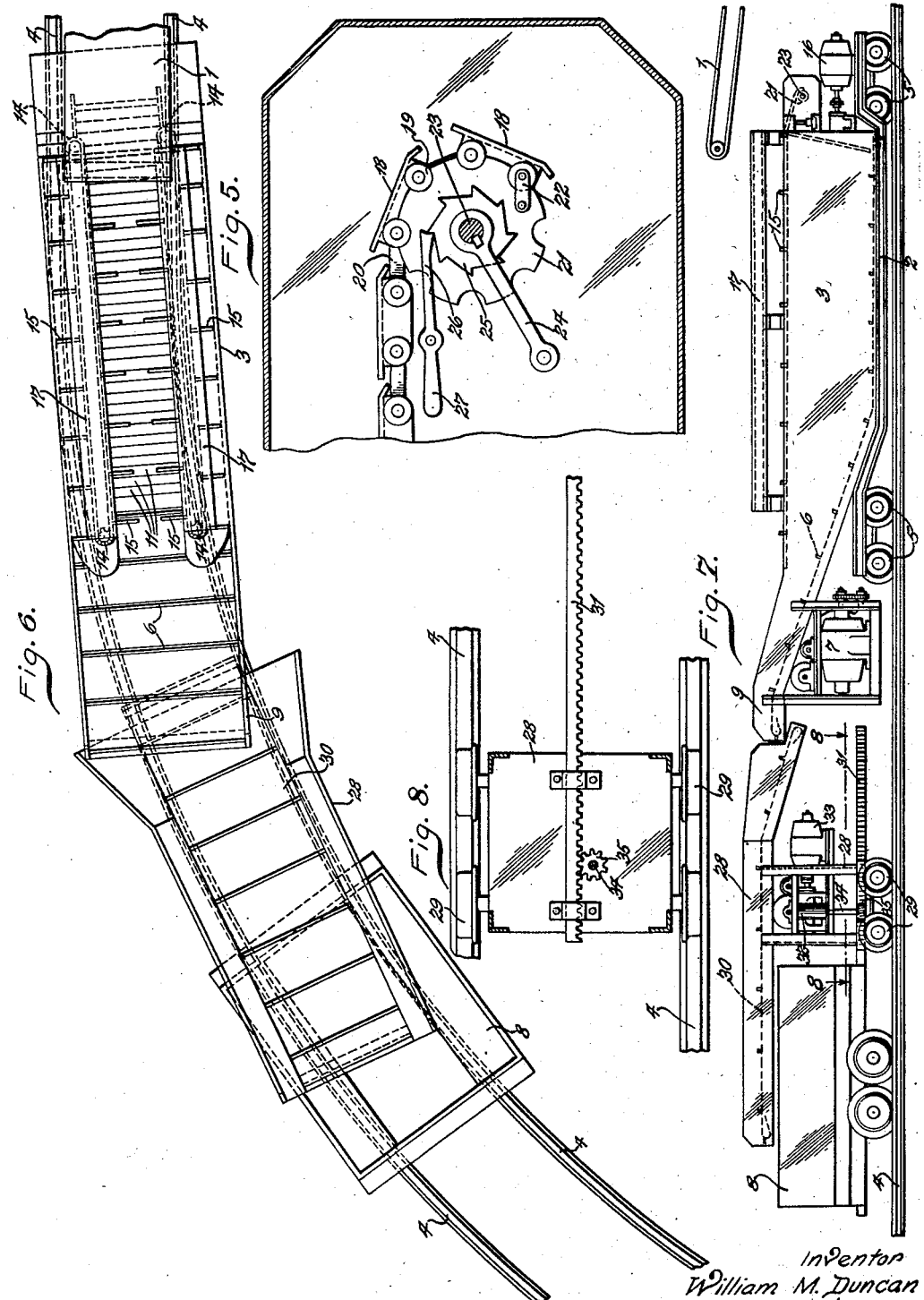

Patented July 28, 1942

2,290,950

UNITED STATES PATENT OFFICE 2,290,950

STORAGE LOADING MACHINE

William M. Duncan, Alton, Ill.

Application November 8, 1940, Serial No. 364,781

7 Claims. (Cl. 214—83)

This invention pertains to loading machines and is particularly adapted for application to such loading machines as are used in coal mines to load the coal into mine cars to be hauled away.

The procedure in modern coal mining involves the use of a loading machine which is equipped with gathering means adapted to gather and pick up the loose coal which has been "shot down" and by means of suitable conveyors to deliver the material gathered to the hauling cars. When a car is filled it is drawn away from the loading machine by means of a locomotive, and a new car is moved into place adjacent the loading machine. Modern loading machines have a capacity sufficient to load the ordinary mine car in about one minute. It takes one and a half minutes to move out a loaded car and move a new one into place, during which operation the loading machine must remain idle. Thus, the loading machine is limited by the limitations of the car-handling equipment to operation during less than half of the available time.

One of the objects of this invention, therefore, is to provide apparatus and a procedure whereby the gathering machine may be kept in operation for a greater percentage of the available time by providing facilities for storing the output of that machine during the period when the hauling cars are being changed.

Another object of this invention is to provide such equipment of large capacity, while at the same time so organized that it may be handled on the tracks provided in ordinary mines and may be able to operate on the short curves ordinarily found in such track installations.

Another object is to provide storage means in the form of cars having a receiving bin adapted to receive the output of the gathering machine and means for distributing the material received along the entire bin, together with means for loading material from said bin into the hauling cars.

Another object is to provide a novel structure for such distributing means.

Another object is to provide special loading means, to be used in combination with such a storage car, which may be used on curves so as to receive material from the storage car and deliver it to a hauling car, which could not otherwise be properly placed to receive material from the storage car.

Another object is to provide novel means for handling the aforementioned equipment, and particularly for placing and moving the hauling car with respect thereto.

Further objects will appear from the following description, taken in connection with the accompanying drawings, in which:

Figure 1 is a plan view of a storage car illustrating one embodiment of this invention;

Figure 2 is a side elevation of Figure 1;

Figure 3 is an enlarged section on line 3—3 of Figure 2;

Figure 4 is a sectional detail of the adjustable deck;

Figure 5 is an enlarged detail showing the means for adjusting the deck;

Figure 6 is a plan view illustrating another embodiment of the invention, including the storage car and the intermediate conveyor car;

Figure 7 is a side elevation of the equipment shown in Figure 6, but illustrated as standing on a straight track instead of on a curve, as in Figure 6; and Figure 8 is a detail section taken on a line 8—8 of Figure 7.

Referring now to the drawings, the machine for gathering the coal which has been shot down may be of any suitable type. Such a machine is regularly equipped with a delivery conveyor which extends rearwardly therefrom so that in ordinary use it may overhang the hauling car in order to deliver the material thereto. The delivery conveyor of such a machine is indicated at 1 in Figure 2. A storage car is provided, having a chassis 2 and a body 3 providing a storage bin. This bin is preferably made as large as practicable so as to permit the handling of the storage car on the tracks 4 of the mine, the chassis being equipped with suitable wheels 5 for that purpose. A conveyor 6 is provided in the bottom of the bin and is operable by suitable driving mechanism 7 so as to move material out of the bin 3 and into the mine haulage car 8. When used in the arrangement shown in Figures 1 and 2, the storage car may be provided with a rearward extension 9 adapted to overhang the car 8 so that material may be delivered to any part of the latter.

In accordance with this invention the body 3 of the storage car is provided with a top 10 suitably braced to the body. The top 10 is provided with an opening extending along the central portion of the body and closed by an adjustable deck 11. Suitable angular members 12, secured to the top 10, support the deck 11 for sliding movement therealong, as will be described more in detail hereinafter.

Mounted on the top 10 are suitable guides 13 for a pair of conveyor chains 14, equipped with suitable flights or arms 15 adapted to move the material along the deck 11. Driving means 16 may be provided, connected in any suitable manner to drive the chains 14, so as to move the flights 15 rearwardly over the bin 3, as indicated by the arrows in Figure 1. Thus, material delivered by the conveyor 1 upon the deck 11 will be moved by the conveyor 15 rearwardly of the storage car and deposited in the bin 3 at the rear end of the deck 11. Suitable sloping side members 17 provide guards for the chains 14, and also provide a trough adapted to receive the material and guide it downwardly upon the conveyor 15.

The deck 11 may be constructed of a series of jointed sections 18, equipped at their ends with rollers 19, adapted to roll upon the angles 12. These sections may be connected by links 20 to form a flexible chain structure. The deck 11, therefore, provides the bottom of a channel extending along the top of the body 3, and the conveyor 15 operates in said channel.

The deck 11 is arranged for adjustment so that its delivery end (left-hand end in Figure 1) may be placed at any suitable point along the bin 3 so as to deliver the material at the point. For this purpose the right-hand section may be secured to a suitable winding drum 21 (Figure 5), as by means of a fastening link 22. The drum 21 may be mounted upon an axle 23 arranged to be turned by a crank 24. A ratchet 25 may be arranged to engage a pawl 26 so as to hold the drum 21 in adjusted position. It will be understood that while the conveyor 15 is operating, the flights thereof, in continuously moving over the deck 11 while there is material on that deck, exert a rearward drag, tending to pull the deck to the left (Figure 1). The pawl 26 will therefore prevent such movement. The delivery edge of the deck may be moved forwardly or to the right of Figure 1 by operating the crank 24 to turn the drum 21 in a clockwise direction, as seen in Figure 5, thereby winding up the chain structure of the deck upon the drum 21. Other means for thus accumulating the deck sections as the latter are moved forwardly may be provided, such, for instance, as a well below the drum 21 in which the sections 18 may fold one upon the other as they are deposited in the well by a rotation of the drum 21. In order to adjust the deck in the reverse direction, or to the left of Figure 1, the pawl 26 may be released by pressing downwardly on the handle 27 thereof so as to release the drum 21. When this has been done, the drag of the material upon the deck under the moving force of the flights 15 will cause the deck to move to the left. This movement may be stopped at any adjusted position by engaging the pawl 26 with the ratchet 25.

A storage car, constructed as shown in Figure 2, must be of somewhat limited capacity because the extension 9 projects considerably to the rear of the wheels 5 so that on short turns this extension may swing out to one side of the track so that it would not deliver material to the car 8. The structure illustrated in Figures 6 and 7 makes it possible to provide a storage car of maximum capacity and still be able to handle the apparatus on short curves. In this arrangement an intermediate conveyor car, indicated generally at 28, is provided. This may have any suitable structure and be mounted on wheels 29 for operation on the tracks 4. A conveyor 30 is mounted on this car in such a manner as to receive material from the conveyor 6. This material is received upon the conveyor 30, which in turn delivers it to the hauling car 8. It will be seen from Figure 6 that the car 28 provides an intermediate conveying device adapted to move the material angularly with respect to the conveyor 6 in order to pass it around the curve of the tracks 4. Accordingly, this combination of apparatus may operate in close quarters and in such situations, as, for instance, in a shallow entry where the loading machine 1 takes up most of the room and the car 8 must be placed upon a curve of the track 4.

The conveyor car 28 may be provided with means for adjusting the hauling car 8 so as to distribute the load in the latter. For this purpose a thrust bar 31 may be mounted in any suitable manner for sliding movement fore and aft on the chassis of the car 28. Power driving connections are provided for moving this bar forward and back with respect to the chassis. Such connections may comprise a speed-reduction device 32, arranged to be clutched to the driving mechanism 33, which drives the conveyor 30. From the device 32 the low speed shaft 34 extends downwardly and is equipped at its lower end with a pinion 35 engaging a rack on the thrust bar 31, as indicated in Figure 8. Means for reversing the direction of rotation of the shaft 34 may be provided so that the bar 31 may be moved in either direction. By operating this bar the car 8 may be pushed away from the car 28. By providing a suitable coupling on the rear end of the bar 31 to engage the coupling of the car 8, the operation of the bar 31 forwardly will serve to move the car 8 in the corresponding direction.

In the operation of this device the loading machine 1 is operated in the usual manner and delivers material on the deck 11. During ordinary operation this deck may be extended so that its delivery edge is at its rearmost limit. Accordingly, the material is delivered to the conveyor 6 and is immediately redelivered thereby to the car 8, as in Figure 2, or to the conveyor 30, as in Figure 7. When it becomes necessary to change cars 8 the conveyor 6, or, if desired, both the conveyors 6 and 30, may be stopped during the change of cars. However, the machine 1 is kept in operation. The deck 11 may be adjusted to move its delivered edge forwardly progressively so as to distribute the material along the bin 3. As soon as a new car 8 is placed in position the conveyors 30 and 6 are started up again. These conveyors may preferably operate at a little higher rate than the machine 1, so that the accumulated material in the bin 3 may be loaded into the cars 8 at a faster rate than new material is received from the machine 1. This will avoid an accumulation in the bin 3.

The car 8 will ordinarily be placed as close to the conveyor car 28 as possible, as is indicated in Figure 7. As the loading proceeds, the thrust bar 31 may be operated to move the car 8 rearwardly so that the material may be distributed so as to properly fill the hauling car. When operating without the car 28, as indicated in Figure 2, a thrust bar such as 31 may be mounted upon the storage car.

It will be seen, therefore, that this invention provides an apparatus which may be used in connection with a loading machine 1 to load mine cars and which will provide storage space in which the output of the machine 1 may accumulate during the time that the cars 8 are being changed. Accordingly, the machine 1 may be kept in operation practically continuously and need not be limited by the operation of changing cars. Furthermore, the machine 1 must occasionally be stopped to move it from one place to another in order to attack a fresh pile of material. During that time any excess accumulation of material in the bin 3 may continue to be loaded upon cars 8. In this manner the apparatus provides for bridging-over time intervals, both in the loading of the cars 8 and in the operation of the machine 1.

While the apparatus above described is organized and adapted to operate as a unit, it will be understood that individual features or subcombinations thereof may be useful by themselves without reference to other features or the complete combination. It is understood, therefore, that the employment of such individual features and subcombinations is contemplated by this invention when within the scope of the appended claims.

It is further obvious that various changes in the details of construction may be made within the scope of the appended claims without departing from the spirit of this invention, and that the invention is not limited to the specific details shown and described.

The invention having thus been described, what is claimed is:

1. A handling-car for loading loose material onto hauling cars, comprising, a traveling frame, a body on said frame providing a storage bin, a conveyor in said bin to empty the same into a hauling car, and a receiving conveyor on said body positioned and arranged to receive material thereon from external delivery means and extending over said bin to deliver material thereto.

2. A handling-car for loading loose material onto hauling cars, comprising, a traveling frame, a body on said frame providing a storage bin, a conveyor in said bin to empty the same into a hauling car, a deck on said body extending over said bin, and a receiving conveyor open at its top to receive material from external delivery means and operable over said deck to deliver material to said bin.

3. In a machine of the character described, a traveling frame, a body on said frame providing a storage bin, a conveyor in said bin to empty the same into a hauling car, a deck on said body extending over said bin, a receiving conveyor operable over said deck to deliver material to said bin, and means for adjusting the delivery-point of said deck with respect to said bin.

4. In a machine of the character described, a traveling frame, a body on said frame providing a storage bin and having a top providing a receiving channel open at its top to receive material from external delivery means, a deck adjustable in said channel, and a conveyor moving over said deck to move material therealong and into said bin.

5. In a machine of the character described, a traveling frame, a body on said frame providing a storage bin and having a top providing a receiving channel open at its top to receive material from external delivery means, a deck adjustable in said channel, a conveyor moving over said deck to move material therealong and into said bin, and means for changing the terminal point of said deck in order to distribute the material along said bin.

6. In an apparatus of the character described, a storage car having a receiving bin, a deck over said bin having a series of jointed sections arranged for movement along said deck in order to withdraw successive sections from over said bin to adjust the delivery point of said deck, and a conveyor movable over said deck.

7. A handling car for loading loose material onto a plurality of hauling cars, comprising, a traveling frame, a body on said frame providing a storage bin, material-receiving means on said body operable to distribute received material in said bin, a conveyor extending into the bottom of said bin adapted to transfer the material therefrom to a hauling car, and driving and controlling means for said conveyor, whereby said handling car is adapted for coordination in operation with a loading machine to receive material continuously from the loading machine while delivering the same intermittently to successive hauling cars.

WILLIAM M. DUNCAN.